(12) United States Patent
Ishii

(10) Patent No.: US 8,885,286 B2
(45) Date of Patent: Nov. 11, 2014

(54) MAGNETIC DISK DEVICE AND CONTROL METHOD OF MAGNETIC DISK DEVICE

(71) Applicant: Kabushiki Kaisha Toshiba, Tokyo (JP)

(72) Inventor: Koji Ishii, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/973,950

(22) Filed: Aug. 22, 2013

(65) Prior Publication Data

US 2014/0285922 A1   Sep. 25, 2014

(51) Int. Cl.
*G11B 5/596* (2006.01)

(52) U.S. Cl.
USPC ..................................... 360/77.08

(58) Field of Classification Search
USPC ............... 360/51, 48, 31, 77.08, 77.04, 75
See application file for complete search history.

(56) References Cited

U.S. PATENT DOCUMENTS

| 5,815,485 | A  | * | 9/1998 | Tanaka et al. | ............. 369/275.3 |
| 7,035,035 | B2 |   | 4/2006 | Ito |  |
| 7,408,733 | B2 | * | 8/2008 | Satoh et al. | ............. 360/73.03 |
| 7,486,461 | B2 |   | 2/2009 | Fujii et al. |  |
| 8,446,686 | B2 | * | 5/2013 | Higashino | ............. 360/55 |
| 2009/0086598 | A1 |   | 4/2009 | Kosugi |  |

FOREIGN PATENT DOCUMENTS

JP   2006-012350 A   1/2006

* cited by examiner

*Primary Examiner* — Nabil Hindi
(74) *Attorney, Agent, or Firm* — Patterson & Sheidan, LLP

(57) ABSTRACT

A magnetic disk device includes a magnetic disk, a head and a control section. The head writes data to the magnetic disk. The control section controls the head to move along a virtual circular orbit of the magnetic disk that includes a first servo sector region and a second servo sector region. The second servo sector region has a larger servo interval than the first servo sector region, and stores a larger number of write bits than the first servo sector region.

20 Claims, 14 Drawing Sheets

MAGNETIC DISK DEVICE AND CONTROL METHOD OF MAGNETIC DISK DEVICE

CROSS-REFERENCE TO RELATED APPLICATION

This application is based upon and claims the benefit of priority from Japanese Patent Application No. 2013-057368, filed Mar. 19, 2013, the entire contents of which are incorporated herein by reference.

FIELD

Embodiments described herein relate to a magnetic disk device and a control method of the magnetic disk device.

BACKGROUND

In a magnetic disk device, eccentricity may exist between circular tracks written on a magnetic disk of the magnetic disk device and a circular orbit of a magnetic head of the magnetic disk device. In such cases, eccentricity correction may be performed but this causes the seek time of the magnetic head to increase and the performance of the magnetic disk device to decrease. Instead of eccentricity correction, virtual circle control may be performed to control the magnetic head orbit so that it tracks a circle drawn about the spindle center of the magnetic disk. With virtual circle control, the servo sector region of different tracks is set to follow the virtual circular orbit, and the write-and-read of data is performed at each servo sector region.

DETAILED DESCRIPTION

Embodiments provide a magnetic disk device that improves virtual circle control characteristics.

In general, embodiments are described with reference to the attached figures. The invention is not limited to these embodiments.

A magnetic disk device according to an embodiment includes a magnetic disk, a head and a control section. The head writes data to the magnetic disk. The control section controls the head position to move along a virtual circular orbit of the magnetic disk that includes a first servo sector region and a second servo sector region, where the second servo sector region has a larger servo interval than the first sector region, and stores a larger number of write bits than the first servo sector region.

First Embodiment

Figure 1:
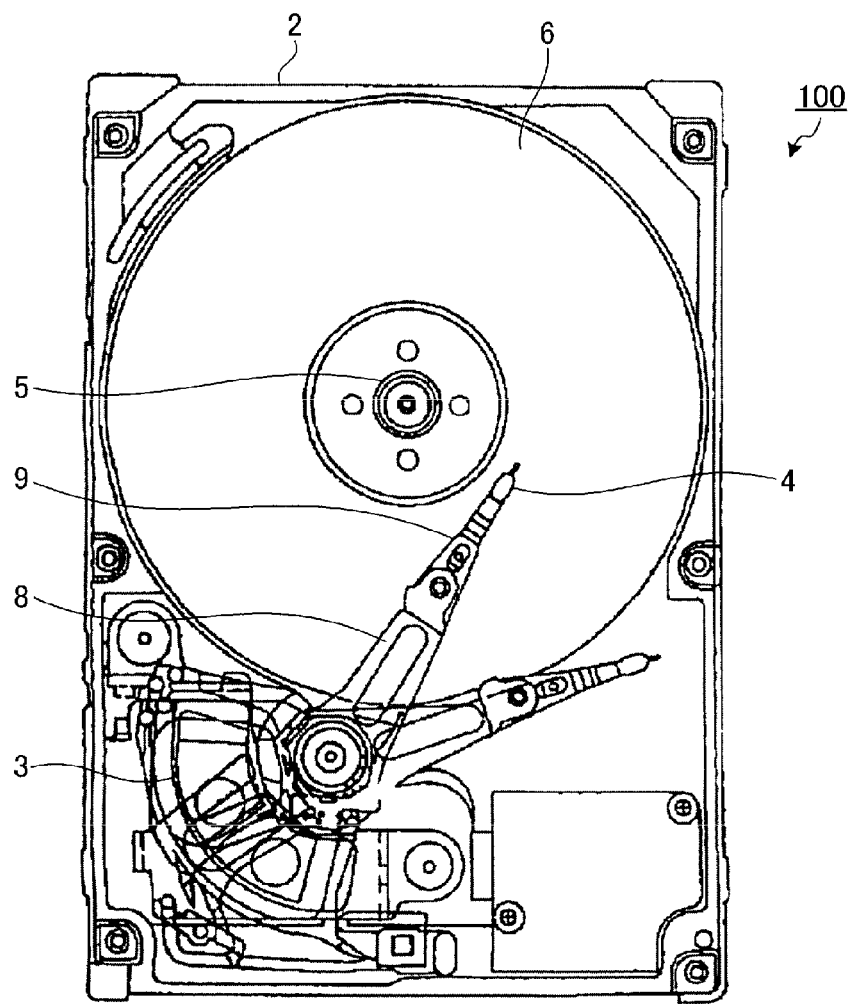
FIG. 1 is a plan view of a magnetic disk device in which embodiments may be practiced.
Figure 2:
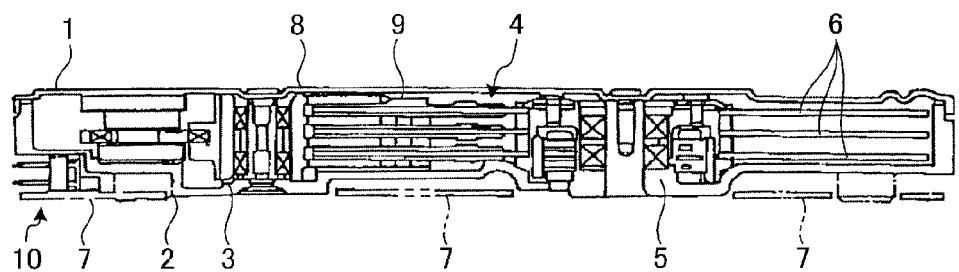
FIG. 2 is a sectional view of the magnetic disk device of FIG. 1.

Referring to FIGS. 1 and 2, a magnetic disk device 100 in which embodiments may be implemented, is described. FIG. 1 is a plan view of the magnetic disk device 100. FIG. 2 is a sectional view of the magnetic disk device 100.

A magnetic disk 6 shown in FIGS. 1 and 2 includes a magnetic recording layer on a substrate (which is a round board). The magnetic disk 6 may have, for example, a size of 2.5 inch (6.35 cm) and be installed in multiple numbers (for example, 3 disks) in the drive. Spindle motor 5 supports the magnetic disk 6 and rotates the magnetic disk 6. A magnetic head 4 is installed with an actuator. This magnetic head 4 is installed in multiple numbers corresponding to the number of front and back sides of the magnetic disks 6 (e.g., twice the number of magnetic disks as shown by magnetic heads 4-1 to 4-6 in FIG. 4). The actuator of the magnetic head 4 includes voice coil motor (VCM) 3, arm 8 and flexure (suspension) 9. The magnetic head 4 is installed at the tip of flexure 9.

The magnetic head 4 reads data from the magnetic disk 6 and writes data to the magnetic disk 6. The magnetic head 4 has an MR (magneto-resistive) element (a playback device) and a write element. Voice coil motor 3 drives the magnetic head 4 along a radial direction of the magnetic disk 6 and positions the magnetic head at a desired track of magnetic disk 6. Voice coil motor 3 and spindle motor (SPM) 5 are installed at a drive base 2. A cover 1 covers the drive base 2 and separates the drive interior from the exterior. A print board 7 is installed under the drive base 2 and mounts the drive control circuit. A connector 10 is installed under the drive base 2 and connects the control circuit to the exterior. This drive may be used as an internal disk of a notebook PC, for example.

Figure 3:
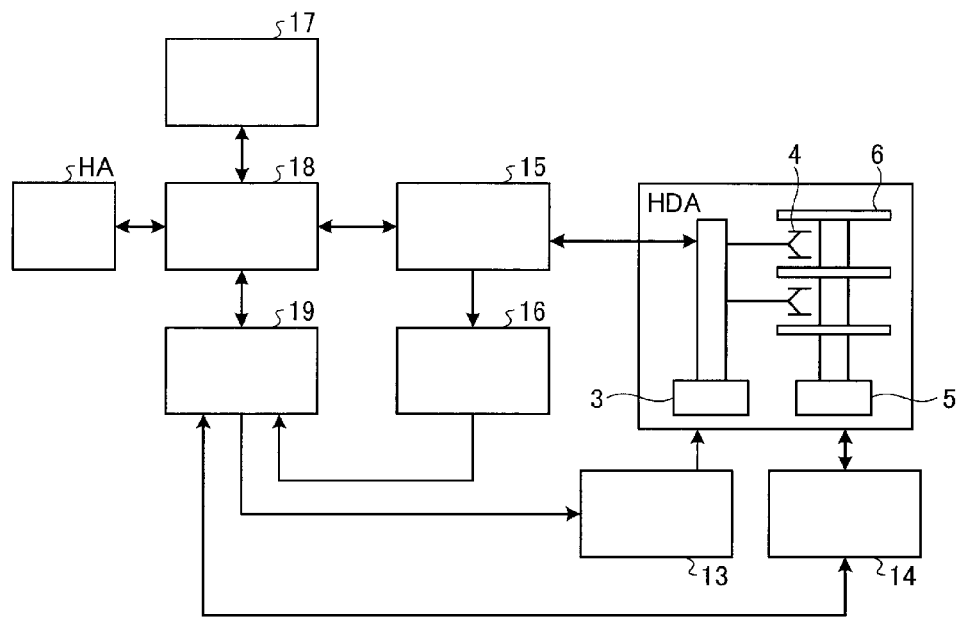
FIG. 3 is a functional block diagram of the magnetic disk device of FIG. 1.

FIG. 3 is a functional block diagram of the magnetic disk device 100. HDC (hard disk controller) 18 performs the sending and receiving of various commands between a host device HA, interface control with the host device HA, such as the sending and receiving of data, and the generation of control signals within the magnetic disk device to control the recording and reproduction format on the magnetic disk medium. A buffer 17 is used for the temporary storage of write data from host device HA and the temporary storage of read data from the magnetic disk 6.

MCU (microcontroller unit) 19 includes a microprocessor (MPU), a memory, a DA converter and an AD converter. MCU 19 performs servo control (positioning control) to determine the position of the magnetic head 4 and to serve other functions. MCU 19 executes programs stored in the memory; recognizes position signals from servo demodulator 16; and calculates the control value of the VCM control current of the voice coil motor 3 to determine the position. Additionally, MCU 19, through a VCM drive circuit 13, controls the voice coil motor 3 and also controls the positioning of the magnetic head 4. MCU 19 also controls the drive current of an SPM drive circuit 14. The magnetic disk 6, the magnetic head 4, the voice coil motor 3 and the spindle motor 5 are stored in the chassis (the cover 1 and the drive base 2) of, for example, an HDA (Hard Disk Assembly).

VCM drive circuit 13 includes the power amplifier that provides the drive current to voice coil motor (VCM) 3. SPM drive circuit 14 includes a power amplifier that provides drive current to the SPM 5, which rotates the magnetic disk 6.

A read channel circuit 15 is a circuit that performs the recording and reproduction. The read channel circuit 15 has a modulation circuit to record write data from the host device HA to the magnetic disk 6, a parallel serial conversion circuit, a demodulating circuit to playback the data from the magnetic disk 6, a serial parallel conversion circuit and other parts. The servo demodulator 16 demodulates, as described later in FIGS. 5A and 5B, the servo pattern SRV0 to SRV15 (refer to FIGS. 7A and 7B) recorded in the magnetic disk 6 and outputs the position signal demodulated at MCU 19.

Each servo pattern SRV0 to SRV15 has, for example, a servo mark, a gray code and a burst section. The servo mark indicates the first section of the servo pattern SRV0 to SRV15 and the reference mark for the read reference. The gray code records the track numbers ("n," "n+1," "n+2" . . . ) for each track as digital data. At the magnetic disk device 100, by demodulating the track numbers recorded in the gray code, the track number at which the magnetic head is positioned may be detected.

The burst section is a recording region where position signals PosA, PosB, PosC, and PosD that show the area pattern of 4 phases shifted by 90 degrees of the phase are recorded so that the offset position from the track center can be detected. The magnetic disk device 100 obtains the amplitude (the equivalent of area) of the position signals PosA, PosB, PosC, and PosD, which are recorded at the burst section, and demodulates the position (the offset position) of the magnetic head from the track center of the detected track number. In this embodiment, the demodulation method is not limited to using the area servo of the offset positions of PosA to PosD. A null servo pattern or phase difference servo pattern may also be utilized.

Although not shown in any of the figures, in the magnetic disk device 100, the head IC includes a write amplifier, which supplies a recording current to the magnetic head 4, and a preamplifier, which amplifies the playback voltage from the magnetic head 4.

Figure 4:
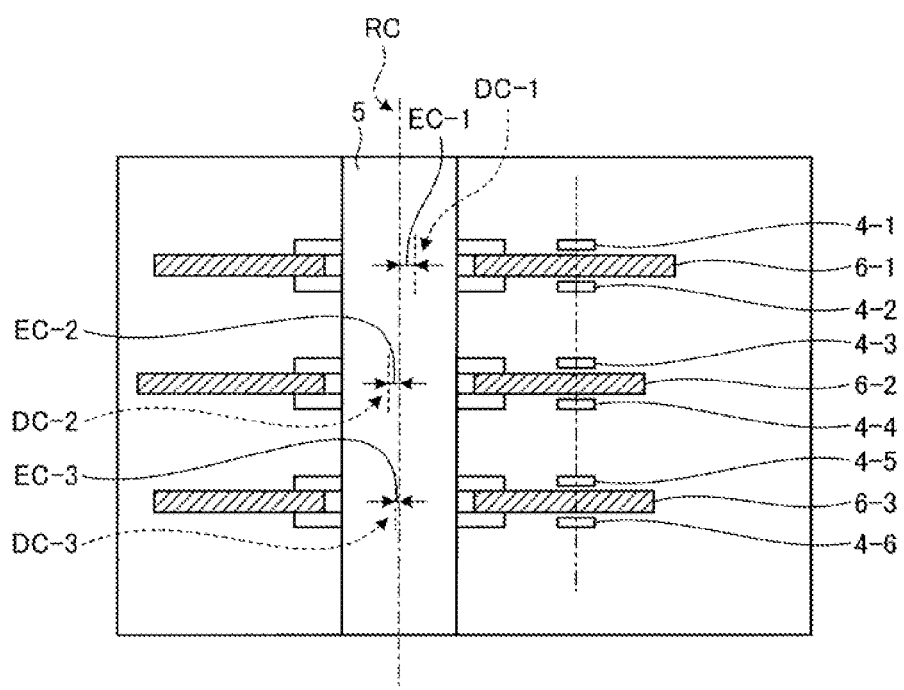
FIG. 4 shows eccentricities of a plurality of magnetic disks installed in the magnetic disk device of FIG. 1.
Figure 5A:
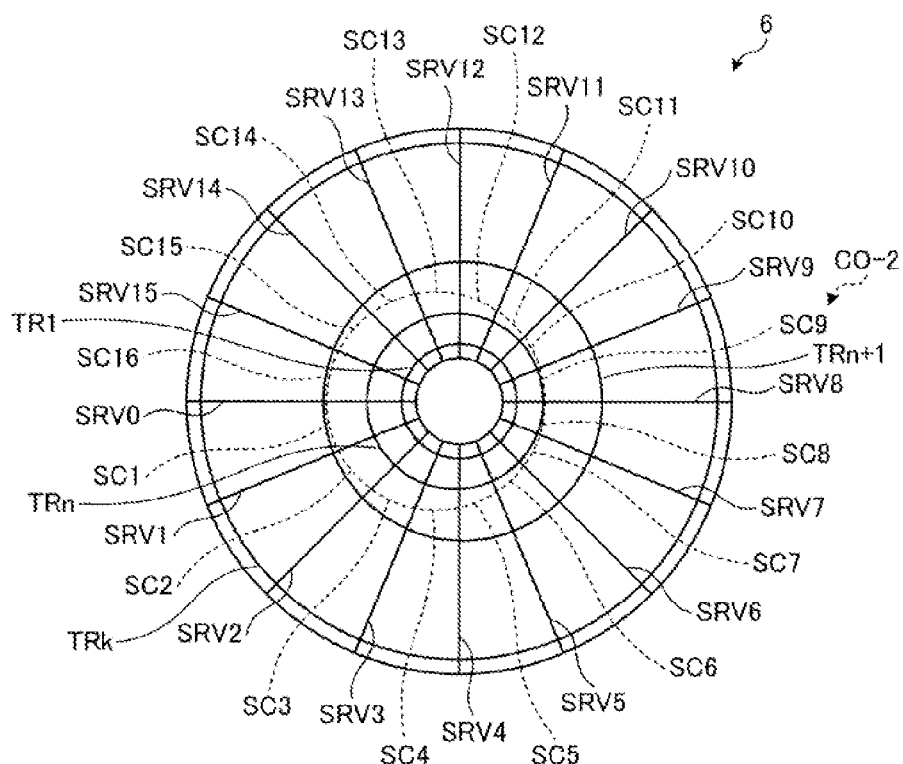
FIGS. 5A and 5B illustrate a virtual circular orbit when eccentricity exists in a magnetic disk.
Figure 5B:
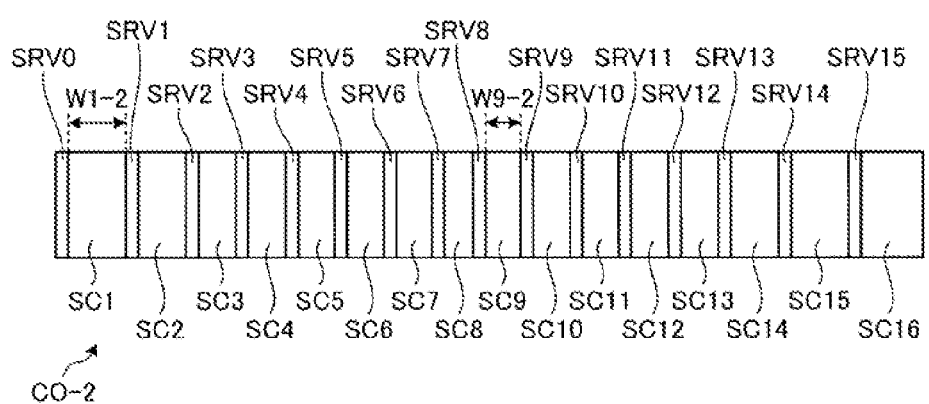

Next, the virtual circle control at the magnetic disk device 100 is described using FIGS. 4 and 5A and 5B. FIG. 4 shows the eccentricities of a plurality of magnetic disks 6-1 to 6-3. FIGS. 5A and 5B illustrate a virtual circular orbit when an eccentricity exists in the magnetic disk 6. In the following, the region between two adjacent servo patterns at the track or virtual circular orbit is called the servo sector region.

The magnetic disk device 100, using the servo pattern SRV0 to SRV15 written on the magnetic disk 6 as shown in FIGS. 5A and 5B, determines the position of each magnetic head 4-1 to 4-6 (refer to FIG. 4) and performs data write-read on the magnetic disk 6.

FIG. 4 shows a plurality of magnetic disks 6-1 to 6-3 installed at the spindle motor (SPM) 5, and it should be understood that the magnetic disks 6-1 to 6-3 are installed after servo patterns SRV0 to SRV15 have been written on each magnetic disk 6-1 to 6-3 by a servo writer; or after the servo patterns SRV0 to SRV15 have been written to one magnetic disk 6-1 as the seed pattern, a multiple of the magnetic disks 6-1 to 6-3 are installed, and then servo patterns SRV0 to SRV15 are written to the other magnetic disks 6-2 and 6-3 (the self-servo write method). Whether using the pattern in which servo write is performed by a servo writer or using the seed pattern, the rotation center RC of the spindle motor 5 and the center DC-1 to DC-3 of the servo pattern SRV0 to SRV15 of the magnetic disks 6-1 to 6-3 may possess eccentricity. In addition, the amount of eccentricity EC-1 to EC-3 of the magnetic disks 6-1 to 6-3 of the magnetic disks 6-1 to 6-3 may vary. The amount of eccentricity EC-1 to EC-3 of the magnetic disks 6-1 to 6-3 may be a vector quantity with direction and magnitude.

According to embodiments, virtual circle control is performed to control each magnetic head orbit 4-1 to 4-6 so that the magnetic heads move along true circles (i.e., the virtual circular orbit CO shown in FIGS. 5A and 5B) that are drawn in relation to the rotation center RC of the magnetic disk. By implementing the virtual circle control, the effects of the differences in the amount of eccentricity EC-1 to EC-3 at each magnetic disk 6-1 to 6-3 are cancelled, and all of the magnetic heads 4-1 to 4-6 move along virtual circles (i.e., the virtual circular orbit CO) that are identical; and each magnetic head 4-1 to 4-6 is position-controlled in this manner. Thus, the seek time of the magnetic heads 4-1 to 4-6 (e.g. the seek time with the head changing) may be shortened, and the performance of the magnetic disk device 100 may be improved.

When virtual circle control is performed, the first eccentricity may not exist (e.g., in an ideal case). In such a case, the virtual circular orbit CO-1 coincides with a corresponding track among the multiple of tracks (not shown), which are set in a concentric manner on the magnetic disk 6. Each track contains a multiple of the servo sector regions wherein the servo intervals are equivalent to each other. As such, in the ideal case, virtual circular orbit CO-1 also includes a multiple of the servo sector regions wherein the servo intervals are equivalent to each other.

In the example illustrated, virtual circular orbit CO-1 includes a multiple of the servo sector regions SC1 to SC16. When the center of the servo pattern and the center of the disk are identical, the servo interval of the multiple of the servo sector regions SC1 to SC16 are equivalent to each other. For example, the servo interval W1-1 of the servo sector region SC1 is equivalent to the servo interval W9-1 of the servo sector region SC9.

However, this may not be the case in practice as shown in FIG. 4, where the eccentricity exists in the amount of eccentricity EC-1 to EC-3 for each magnetic disk 6-1 to 6-3, and the virtual circular orbit CO-2, in one example, becomes similar to the one shown in FIGS. 5A and 5B. The virtual circular orbit CO-2 shown in FIG. 5A, for example, coincides with the nth track TRn at the right side in FIG. 5A, among the multiple tracks TR1 to TRk, set in a concentric manner on the magnetic disk 6 and with the (n+1)-th track TRn+1 outside of the nth track at the left side in FIG. 5A; or in another example, coincides with the nth track TRn and the n+1 th track TRn+1 at the top and bottom in FIG. 5A. Each track TR1 to TRk includes multiple servo sector regions, in which the servo intervals are equivalent to each other. Also, the servo interval of each servo sector region of each track TR1 to TRk is large at the outer tracks. For this reason, virtual circular orbit CO-2 includes multiple servo sector regions that have servo intervals different from each other.

For example, virtual circular orbit CO-2 includes multiple the servo sector regions SC1 to SC16, as shown in FIG. 5A. The multiple servo sector regions SC1 to SC16 have the servo intervals different from each other as shown in FIG. 5B. For example, the servo interval W1-2 of the servo sector region SC1 is larger than servo interval W9-2 of the servo sector region SC9. Along the virtual circular orbit CO-2, for example, from the servo sector region SC1 to the servo sector region SC9, the servo intervals gradually become smaller. From the servo sector region SC9 to the servo sector region SC16, the servo intervals become gradually larger (refer to FIG. 8A).

Figure 6:
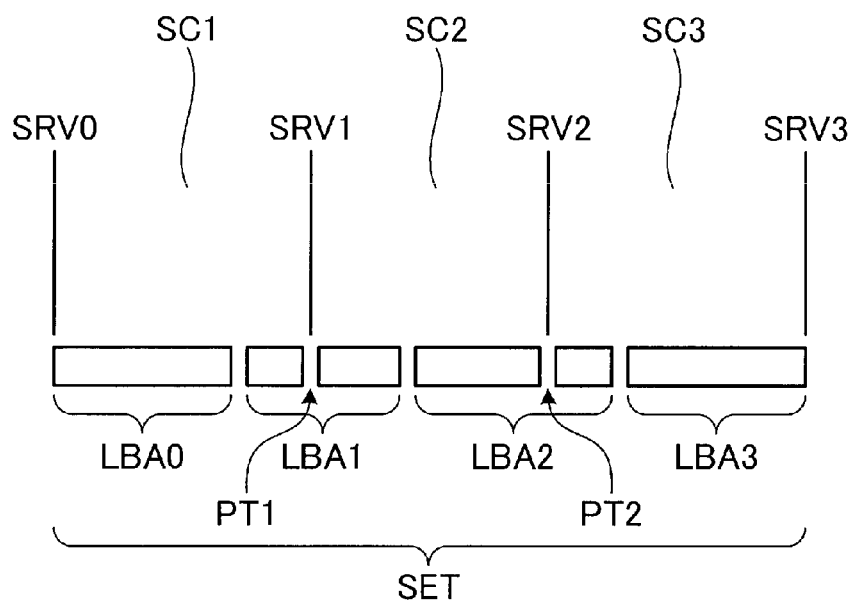
FIG. 6 shows the configuration information for setting a data format of the virtual circular orbit.
Figure 7A:
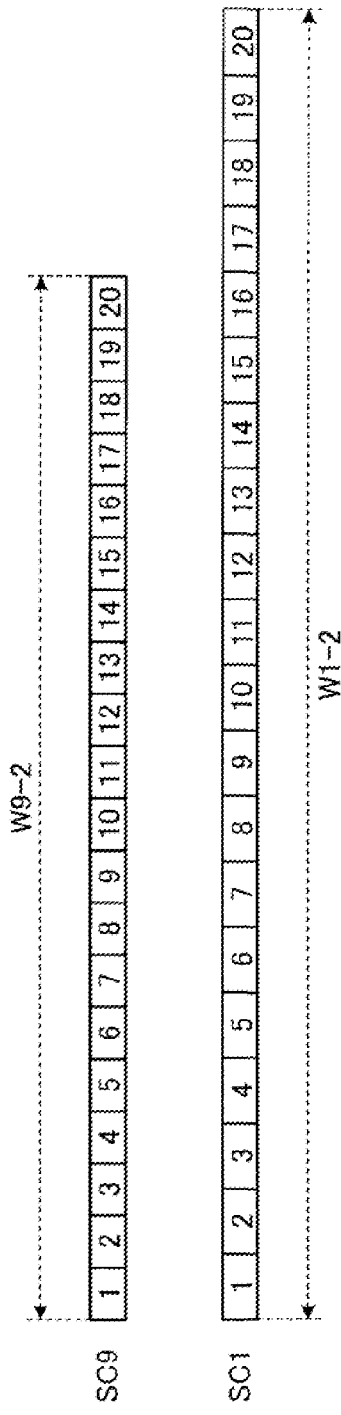
FIGS. 7A and 7B respectively show the data format of a servo sector region according to a comparative example and according to a first embodiment.
Figure 7B:
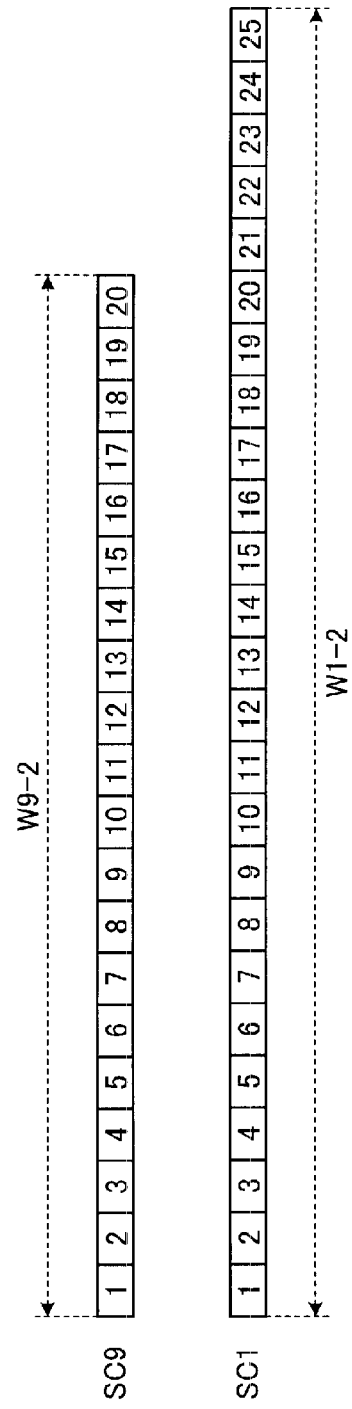
Figure 8A:
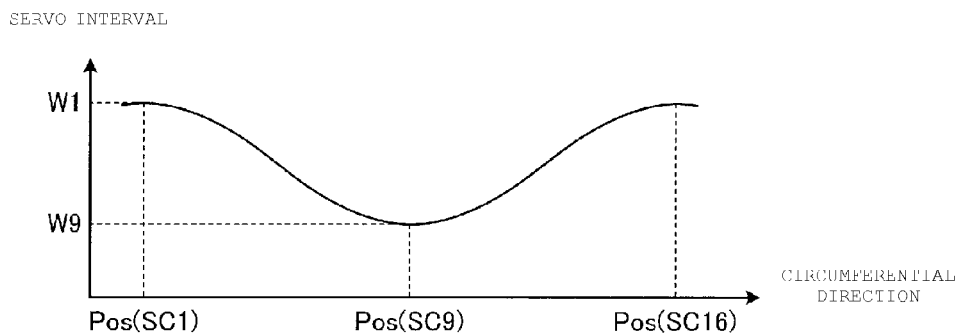
FIGS. 8A to 8C show the data format characteristics at each servo sector region of the virtual circular orbit in the first embodiment.
Figure 8B:
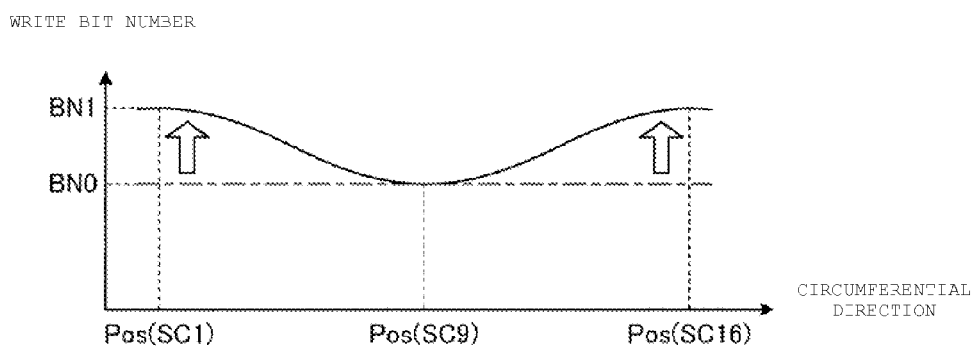
Figure 8C:
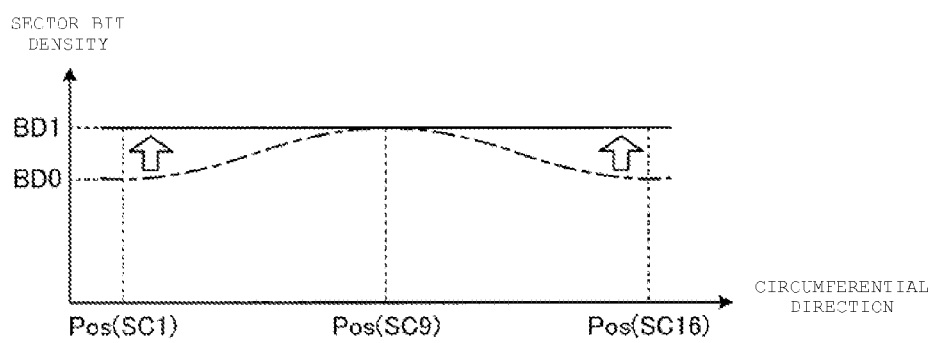

Next, the data format at the magnetic disk device 100 is described using FIGS. 6 to 8C. FIG. 6 shows the configuration information for setting a data format of the virtual circular orbit. FIG. 7A shows the data format of the servo sector region of a comparative example. FIG. 7B shows the data format of the servo sector region of a first embodiment. FIG. 8A shows the distribution of the servo interval along the virtual circular orbit. FIG. 8B shows the distribution of the write bits along the virtual circular orbit. FIG. 8C shows the distribution of the sector bit density along the virtual circular orbit. Note that, in FIGS. 8A to 8C, the position in the circumferential direction of the servo sector region is expressed as Pos (the number SC* of the servo sector region).

When the data format is set for the virtual circular orbit CO, the configuration information shown in FIG. 6 may be used, in one example. The configuration information of the data format, for example, is set within a logical block including a multiple of write blocks (a multiple of physical blocks), up to which write block should be included in the servo sector region, which is the setting target. The logical block is an access unit from the host HA (FIG. 3) and corresponds to the logical address specified by the command from the host HA, for example. Each logical block has, for example, a fixed bit length. The write block (the physical block) corresponds to the physical address specified when the read control or the write control is performed, for example, at the HDC 18 (refer to FIG. 3). Each write block has, for example, a fixed bit length. The data format is set by the firmware executed at MCU 19.

As shown in FIG. 6, if 4 logical blocks LBA0 to LBA3 fit in 3 servo sector regions SC1 to SC3, correlations between the 4 logical blocks LBA0 to LBA3 and the 3 servo sector regions SC1 to SC3 are made to be one set of information SET. In this configuration information, the information including information corresponding to at least the truncation positions (for example, information that indicates what number of write blocks) PT1, PT2 and information to distinguish the truncated logical blocks LBA1, LBA2 are sufficient. Then, by repeating the set information SET, the data format may be set for one revolution of the virtual circular orbit CO.

For example, each logical block includes the first to k-th write blocks, and, as shown in FIG. 6, the first to k-th write blocks of the logical block LBA0 and the first to (k−p)-th write blocks of the logical block LBA1 are assigned to the servo sector region SC1. The (k−p+1)-th to k-th write blocks of the logical block LBA1 and the first to—(k−q)-th write blocks of the logical block LBA2 are assigned to the servo sector region SC2. The (k−q+1)-th to k-th write blocks of the logical block LBA2 and the first to k-th write blocks of the logical block LBA3 are assigned to the servo sector region SC3.

Here, consider the hypothetical case in which the data format is set so that the write bits of each servo sector region along the virtual circular orbit CO are equivalent (for example, the characteristics of dashed line in FIG. 8B). In such a case, for example, since spindle motor 5 (refer to FIG. 1) rotates the magnetic disk 6 at a certain rotational speed, when HDC18 performs the read-write operation through the magnetic head 4, to match the setting of the data format, the frequency of the clock used for the read-write control is adjusted by modification as appropriate. In this way, irregularities in bit density occur in one revolution of the virtual circular orbit CO.

In the example of FIG. 6, for the write block numbers corresponding to the write bits of each servo sector region SC1 to SC3, the following equation 1 holds:

$$k+(k-p)=p+(k-q)=q+k \quad \text{equation 1}$$

If each side of the equation 1 takes the value of 20 (i.e., the write block number of each servo sector region SC1 to SC16 is 20), for example, the data format of the servo sector region SC9, SC1 is as shown in FIG. 7A. Thus, 20 write block is assigned each to the servo sector region SC9 and the servo sector region SC1.

In this case, the servo interval W1-2 of the servo sector region SC1 is wider than the servo interval W9-2 of the servo sector region SC9. Also, each write block has a fixed bit length. For this reason, the bit density of the servo sector region SC1 is smaller than the bit density of servo sector region SC9.

Along the virtual circular orbit CO-2, for example, from the servo sector region SC1 to the servo sector region SC9, the servo interval becomes gradually smaller, and from the servo sector region SC9 to the servo sector region SC16, the servo interval becomes larger (refer to FIG. 8A). For this reason, along the virtual circular orbit CO-2, from the servo sector region SC1 to the servo sector region SC9, the bit density gradually increases, and from the servo sector region SC9 to the servo sector region SC16, the bit density gradually decreases (refer to the dashed line in FIG. 8C).

As shown in FIG. 8C, in the servo sector region SC9 where the servo interval is small, even if increased bit density results in an error rate beyond the threshold level, i.e., even if the bit density is increased near the upper maximum to contain an error rate within the allowable range, there is still room to increase the bit density at the servo sector region SC1 where the servo interval is large. This means that, it would be wasteful from the viewpoint of increasing the surface density if the data format is set so that the write bit number at each servo sector region is equivalent.

Therefore, in this embodiment, improvement of the surface density of the magnetic disk device 100 is achieved by increasing the number of write bits to the servo sector region where the servo interval is large so that there is a greater number of these write bits than the number of write bits in the servo sector region where the servo interval is small.

As shown in FIG. 7B, for example, whereas 20 write blocks are assigned to the servo sector region SC9, 25 write blocks are assigned to the servo sector region SC1.

In this case, the servo interval W1-2 of the servo sector region SC1 is wider than the servo interval W9-2 of the servo sector region SC9. Also, each write block has a fixed bit length. For this reason, the bit density of the servo sector region SC1 is increased so that the bit density approaches the bit density of servo sector region SC9 (for example, to become equivalent).

Along the virtual circular orbit CO-2, from the servo sector region SC9 to the servo sector region SC1, for example, the servo interval becomes gradually larger (refer to FIG. 8A). Correspondingly, from the servo sector region SC9 to the servo sector region SC1, the number of write bits gradually increases (refer to the feature the solid line in FIG. 8B). The number of write bits of the servo sector region SC1 increase from BN0 to BN1, for example. Also, from the servo sector region SC9 to the servo sector region SC16, the servo interval becomes gradually larger (refer to FIG. 8A). Correspondingly, from the servo sector region SC9 to the servo sector region SC16, the number of write bits gradually increase (refer to the feature of the solid line in FIG. 8B).

Therefore, through one revolution of the virtual circular orbit CO-2, the bit density in the servo sector region where the servo interval is large may be increased to approach the bit density in the servo sector region where the servo interval is small (for example, to become equivalent) (refer to the feature of the solid line in FIG. 8C). For example, the bit density of the servo sector region SC1 may be increased from BD0 to BD1.

The setting of this type of data format may be accomplished, for example, by making the set information SET shown in FIG. 6 the information of one revolution. That is, this may be accomplished by making the correspondence relationship between the multiple of logical blocks and the servo sector regions SC1 to SC16 of one revolution, one set information SET. In this case, for example, since spindle motor 5 (refer to FIG. 1) rotates the magnetic disk 6 at a certain rotational speed, when HDC18 performs the read-write operation through the magnetic head 4, to match the setting of the data format, the frequency of the clock used for the read-write control is adjusted. For example, when the data format is set so that the bit density is equivalent through one revolution of the virtual circular orbit CO-2, HDC18 may adjust the frequency clock used for the read-write control to be approximately constant when the read-write operation is performed through the magnetic head 4.

Figure 9:
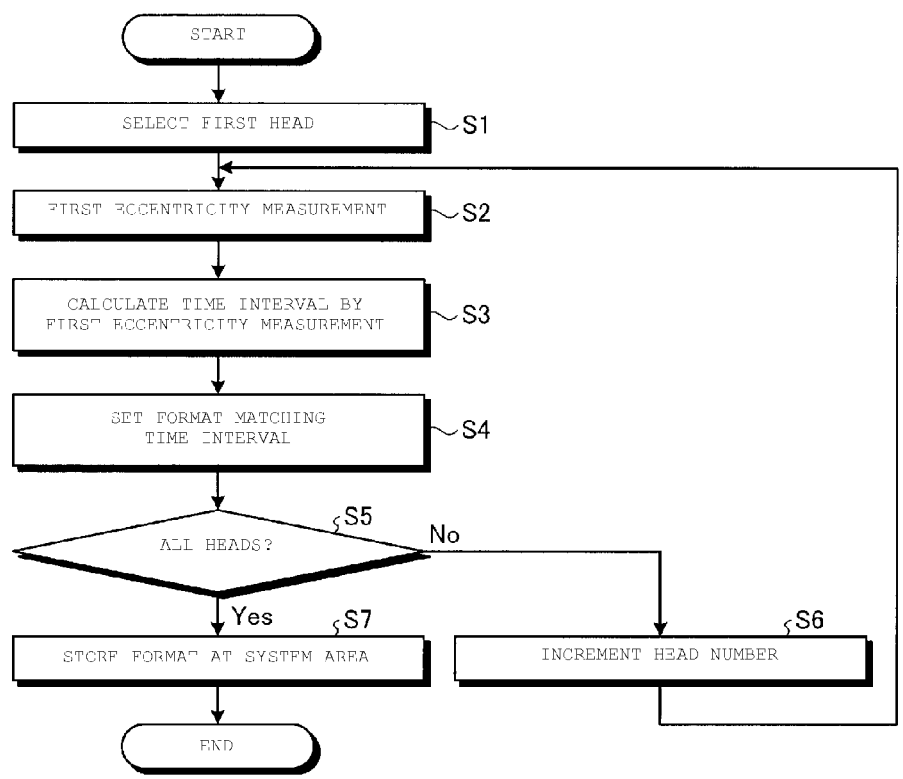
FIG. 9 is a flowchart showing the actions of the magnetic disk device that is configured according to embodiments.

Next, the magnetic disk device 100 is described using FIG. 9. FIG. 9 is a flow chart showing the operation of magnetic disk device 100.

At step S1, HDC18 (refer to FIG. 3) sets the head number at an initial value and selects the head number of the magnetic head 4 so as to control the magnetic head 4 first among the multiple of magnetic heads 4-1 to 4-6 (refer to FIG. 4).

At step S2, HDC18 reads the servo information from the servo patterns SRV0 to SRV15, using the magnetic head 4 selected at step S1. And, HDC18, corresponding to the read servo information, estimates the position of the centers of DC-1 to DC-3 of the magnetic disk 6 and, corresponding to the estimated position of the centers of DC-1 to DC-3, determines the quantity of eccentricity EC of the first eccentricity of the magnetic disk 6.

At step S3, HDC18, corresponding to the amount of eccentricity EC (for example, the vector quantity), which is determined at the step S2, calculates the servo interval of each servo sector region SC1 to SC16 along the virtual circular orbit CO. For example, since spindle motor 5 (refer to FIG. 1) rotates the magnetic disk 6 at a certain rotational speed, HDC18, as the servo interval of each servo sector region SC1 to SC16 and for each servo sector region SC1 to SC16, calculates the time interval at which the magnetic head 4 passes through servo patterns SRV0 to SRV15 at both ends.

At step S4, HDC18, corresponding to the servo interval of each servo sector region SC1 to SC16 calculated at step S3, sets the data format of each servo sector region SC1 to SC16. For example, HDC18 sets the data format of each servo sector region SC1 to SC16, so that the number of write bits of the servo sector region where the servo interval is large is larger than the number of write bits of the servo sector region where the servo interval is small. For example, HDC18 increases the bit density of the servo sector region where the servo interval is large so that the bit density of the servo sector region where the servo interval is large approaches to the bit density of the servo sector region where the servo interval is small (for example, to be equivalent).

At step S5, by referring to, among others, the present head number for all of the multiple magnetic heads 4-1 to 4-6 (refer to FIG. 4), HDC18 judges whether or not the data format for all magnetic heads has been set. If the data format has not been set for all of the multiple magnetic heads 4-1 to 4-6 ("No" at step S5), HDC18 proceeds to the step S6. If the data format has been set for all of the multiple magnetic heads 4-1 to 4-6, ("Yes" at step S5), HDC18 proceeds to the step S7.

At step S6, HDC18 selects the unselected head number among the multiple head numbers corresponding to the magnetic heads 4-1 to 4-6. For example, HDC18 increments the present head number if the multiple head numbers are continuous. Then, HDC18 returns to step S2.

At step S7, HDC18 stores the configuration information (refer to FIG. 6) of the data format of the multiple magnetic heads 4-1 to 4-6 in the system area of the magnetic disk 6.

In the first embodiment, at the magnetic disk device 100, the number of write bits of the servo sector region (the second servo sector region) SC1 where the servo interval is large in the virtual circular orbit CO is greater than the number of write bits of the servo sector region (the first servo sector region) SC9 where the servo interval is small. Therefore, in comparison to the case where the data format is set so that the number of write bits are equivalent at each servo sector region (the comparative example), the surface density to record to the magnetic disk 6 at the magnetic disk device 100 may be improved. That is, at the magnetic disk device 100, the data format characteristics relating to the surface density may be improved. Therefore, improvement of the surface density is possible while maintaining the merit of the virtual circle control, and in comparison to the comparative example, providing the magnetic disk device with a large capacity may become possible.

Also, in the first embodiment, at the magnetic disk device 100, HDC18 (the control section) is giving precedence to the recording capacity of the magnetic disk 6, so that the write-bit density of the servo sector region (the second servo sector region) SC1 is increased to approach to the write-bit density of the servo sector region (the first servo sector region) SC9. For example, through one revolution of the virtual circular orbit CO-2, HDC18 (the control section) 18 increases the bit density of the servo sector region where the servo interval is large so that the bit density approaches the bit density of the servo sector region where the servo interval is small (for example, to become equivalent). Therefore, in comparison to the case where the data format is set so that the number of write bits of each servo sector region are equivalent, through one revolution of the virtual circular orbit CO-2, the surface density to record to the magnetic disk 6 at the magnetic disk device 100 may be improved (for example, near the upper limit to contain the error rate in the allowable range (for example, bit density BD1 as shown in FIG. 8C)).

Also, in the first embodiment, since the bit density of each servo sector region at the magnetic disk device 100 may be made uniform along the virtual circular orbit CO-2, the error rate of each servo sector region may be also homogenized. Therefore, at the read control, the frequency of the occurrence of error correction processing may also be made uniform, and the read action may be stabilized.

FIGS. 10 and 11A to 11C show the case of setting the bit density of the servo sector region where the servo interval is large to a median value of the bit density of the servo sector region where the servo interval is large and the bit density of the servo sector region where the servo interval is small.

Figure 10:
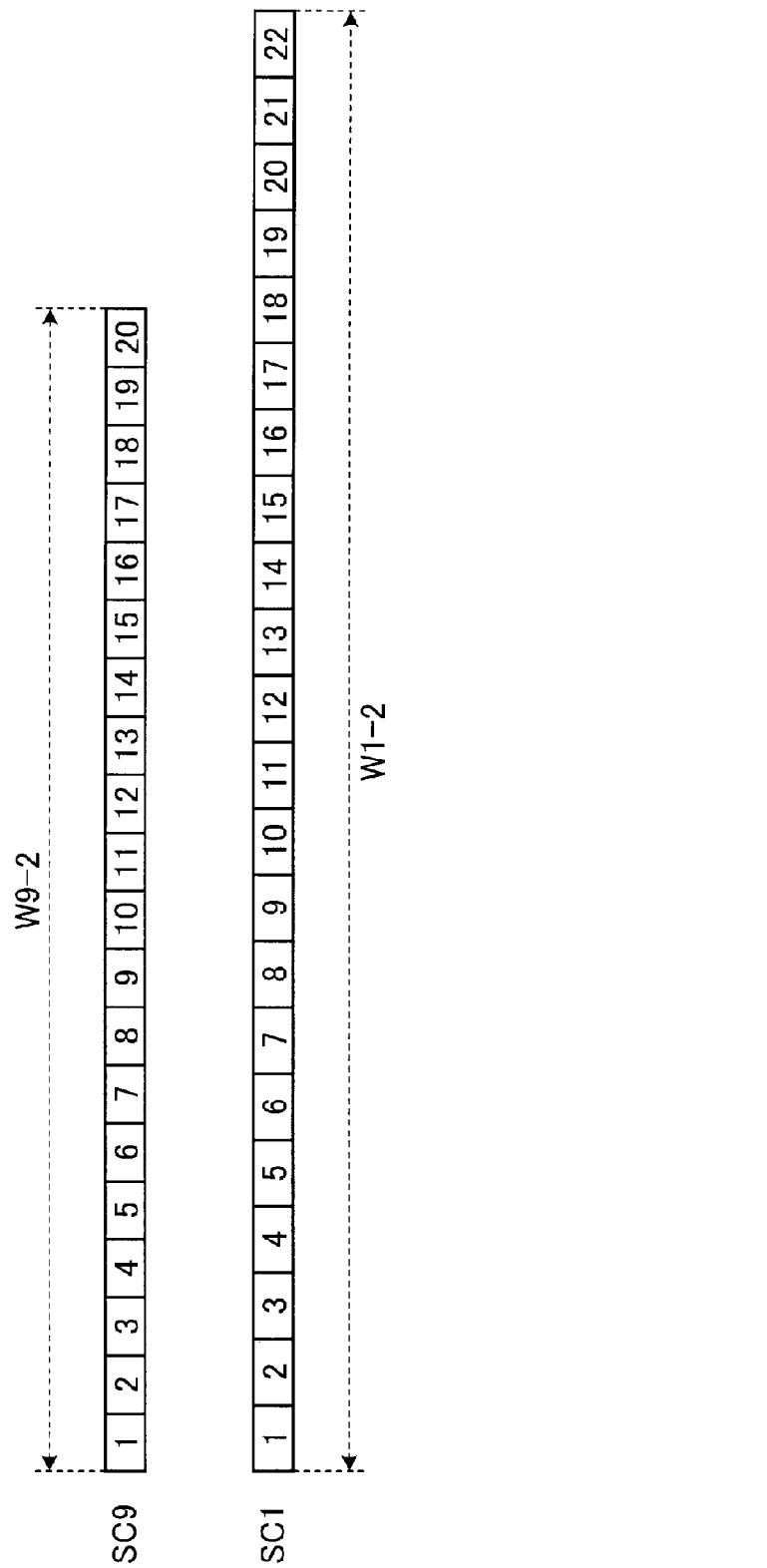
FIG. 10 shows the data format of the servo sector region according to a modified first embodiment.

As shown in FIG. 10, whereas 20 write blocks are assigned to the servo sector region SC9, for example, 22 write blocks are assigned to the servo sector region SC1. Twenty-two is greater than the number of write blocks in the comparative example of the servo sector region SC1 (20) and is smaller than the number of write blocks (25) that accomplishes the bit density equivalent to the bit density of the servo sector region where the servo interval is small.

Figure 11A:
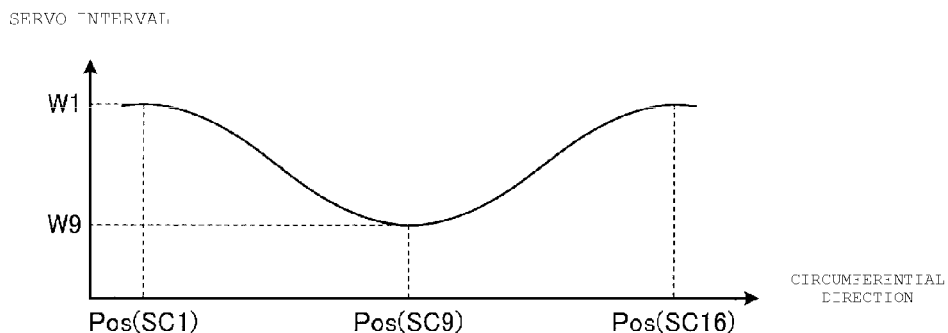
FIGS. 11A to 11C show the data format characteristics at each servo sector region of the virtual circular orbit in the modified first embodiment.
Figure 11B:
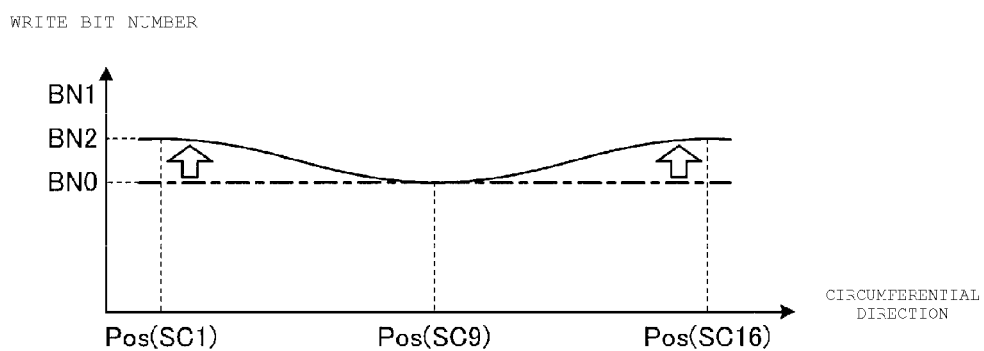
Figure 11C:
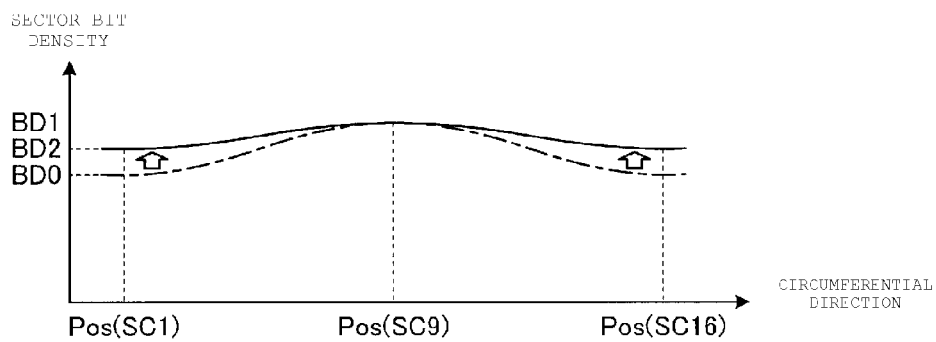

For example, along the virtual circular orbit CO-2, from the servo sector region SC9 to the servo sector region SC1, the servo intervals gradually become larger (refer to FIG. 11A). Correspondingly, from the servo sector region SC9 to the servo sector region SC1, the number of write bits gradually increases (refer to the feature of the solid line in FIG. 11B). For example, the number of write bits of the servo sector region SC1 are increased from BN0 to BN2, which is between BN0 and BN1. Also, from the servo sector region SC9 to the servo sector region SC16, the servo intervals gradually become larger (refer to FIG. 11A). Correspondingly, from the servo sector region SC9 to the servo sector region SC16, the number of write bits gradually increases (refer to the feature of the solid line in FIG. 11B). Therefore, through one revolution of the virtual circular orbit CO-2, the bit density in the servo sector region where the servo interval is large may be increased to approach the bit density in the servo sector region where the servo interval is small (refer to FIG. 11C). For example, the bit density of the servo sector region SC1 may be increased from BD0 to BD2 at an intermediate density between BD0 and BD1.

Figure 12A:
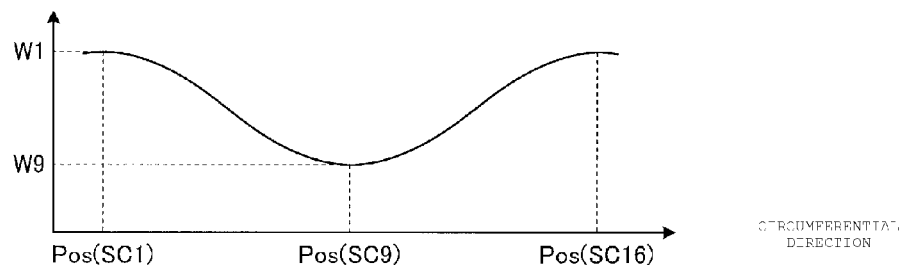
FIGS. 12A to 12C show the data format characteristics at each servo sector region of the virtual circular orbit in another modification of the first embodiment.
Figure 12B:
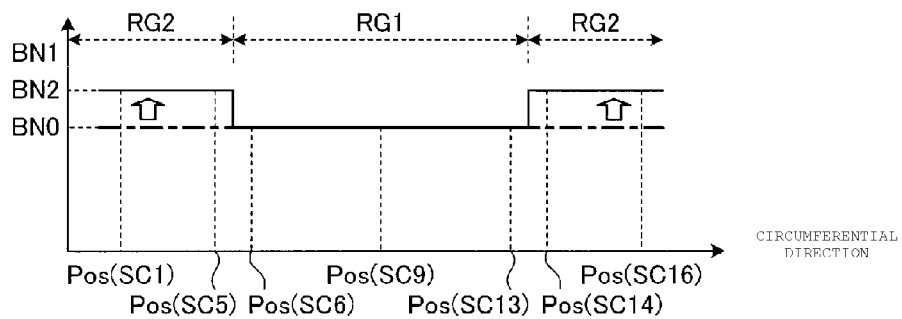
Figure 12C:
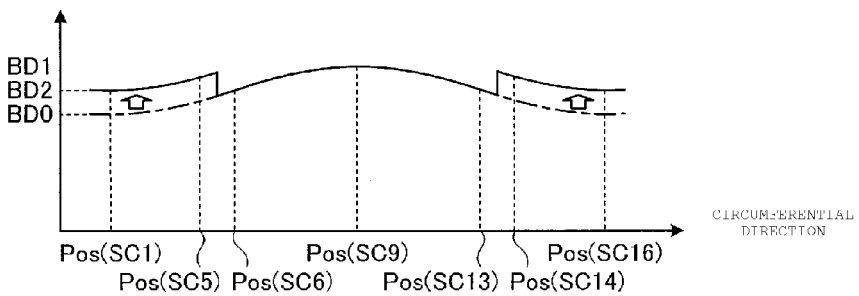

Or, as shown in FIG. 12, when the number of write bits are increased from the servo sector region where the servo interval is small to the servo sector region where the servo interval is large, the write bits may be increased in 2 steps.

For example, from the servo sector region SC9 to the servo sector region SC6, the number of write bits is set as an approximate constant number BN0, and from the servo sector region SC5 to the servo sector region SC1, the number of write bits is set as an approximate constant number of write bits BN2 larger than BN0. That is, from the servo sector region SC9 to the servo sector region SC1, the number of write bits are increased in 2 steps (refer to the feature of the solid line in FIG. 12B). Also, from the servo sector region SC9 to the servo sector region SC13, the number of write bits is set as an approximate constant number BN0, and from the servo sector region SC14 to the servo sector region SC16, the number of write bits is set as write bits BN2. That is, from the servo sector region SC9 to the servo sector region SC16, the number of write bits are increased in 2 steps (refer to the feature of the solid line in FIG. 12B). Therefore, with the approximate half-revolution of the virtual circular orbit CO-2, the bit density of the servo sector region where the servo interval is large may be increased to approach the bit density of the servo sector region where the servo interval is small. For example, the bit density of the servo sector region SC1 may be increased from BD0 to BD2 (at an intermediate density between BD0 and BD1).

This type of data format setting may be accomplished, for example, by preparing 2 kinds of the set information SET, as shown in FIG. 6, information for the first region RG1, which is the write bit number BN0, and information for the second region RG2, which is write bit number BN2. That is, at the first region RG1, the data format is set by repeating the set information SET for the first region RG1, and at the second region RG2, the data format is set by repeating the set information SET for the second region RG2.

Second Embodiment

Next, the magnetic disk device according to the second embodiment is described in the following, with the primary focus being on the parts that are different from the first embodiment.

The first embodiment is an example where precedence is given to the recording capacity of the magnetic disk device 100; however, the second embodiment is an example where the reliability of the magnetic disk device 100 is given precedence.

Figure 13:
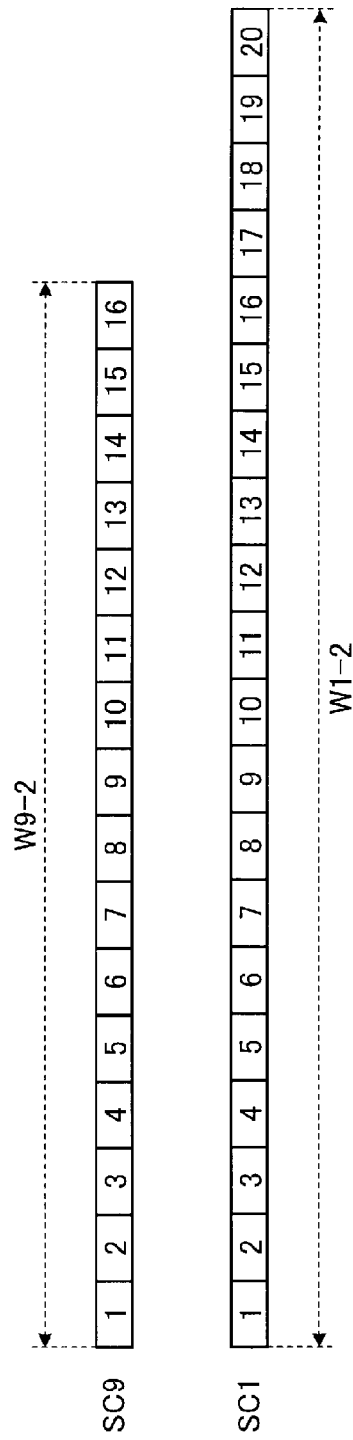
FIG. 13 shows the data format of the servo sector region according to a second embodiment.
Figure 14A:
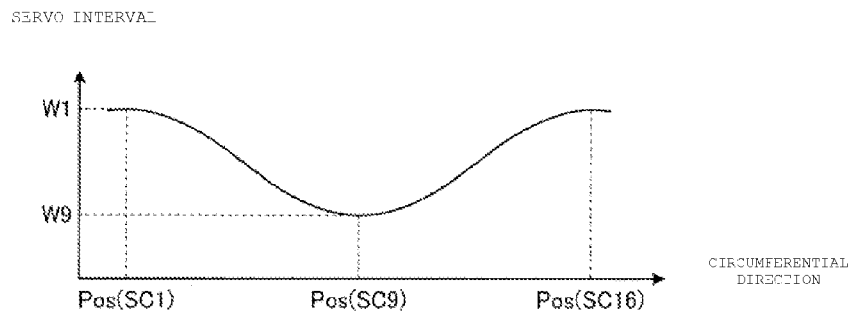
FIGS. 14A to 14C show the data format characteristics at each servo sector region of the virtual circular orbit in the second embodiment.
Figure 14B:
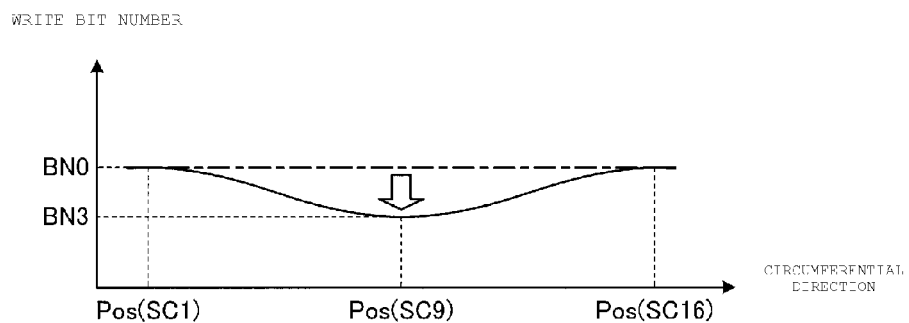
Figure 14C:
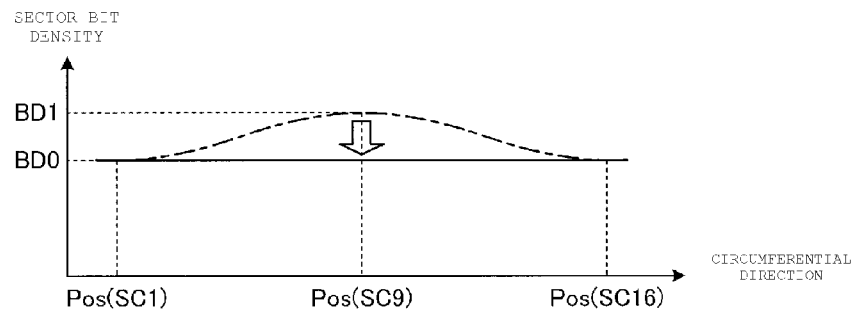

In the second embodiment, as shown in FIGS. 13 and 14A to 14C, by making the number of write bits of the servo sector region where the servo interval is small less than the number of write bits of the servo sector region where the servo interval is large, the improvement of the reliability of the magnetic disk device 100 is achieved. Whereas, at the region where the bit density is high, the error rate is highly likely to deteriorate, and the error margin is small; at the region where the bit density is low, the error rate may be lowered, and the large error margin may be taken. For this reason, the reliability may be increased by decreasing the bit density. FIG. 13 shows the data format of the servo sector region in the second embodiment. FIG. 14A shows the distribution of the servo interval along the virtual circular orbit. FIG. 14B shows the distribution of the number of write bits along the virtual circular orbit. FIG. 14C shows the distribution of the sector bit density along the virtual circular orbit. Note that, in FIGS. 14A to 14C, the position in the circumferential direction of the servo sector region is shown as Pos (number SC* of the servo sector region).

For example, as shown in FIG. 13, whereas 20 write blocks are assigned to the servo sector region SC1, 16 write blocks are assigned to the servo sector region SC9. Sixteen is smaller than the number of write blocks (20) in the comparative example of the servo sector region SC9.

In this case, the servo interval W9-2 of the servo sector region SC9 is smaller than the servo interval W1-2 of the servo sector region SC1. Also, each write block has a fixed bit length within each servo sector region. For this reason, the bit density of the servo sector region SC9 is decreased so that the bit density approaches the bit density of servo sector region SC1 (for example, to become equivalent).

Along the virtual circular orbit CO-2 (refer to FIGS. 5A and 5B), from the servo sector region SC1 to the servo sector region SC9, for example, the servo interval gradually becomes smaller (refer to FIG. 14A). Correspondingly, from the servo sector region SC1 to the servo sector region SC9, the number of write bits decrease gradually (refer to the feature of the solid line in FIG. 14B). For example, the number of write bits of the servo sector region SC9 is decreased from BN0 to BN3. Also, from the servo sector region SC16 to the servo sector region SC9, the servo interval gradually becomes smaller (refer to FIG. 14A). Correspondingly, from the servo sector region SC16 to the servo sector region SC9, the number of write bits is gradually decreased (refer to the feature of the solid line in FIG. 14B).

Therefore, through one revolution of the virtual circular orbit CO-2, the bit density in the servo sector region where the servo interval is small may be decreased to approach the bit density in the servo sector region where the servo interval is large (for example, to become equivalent) (refer to the feature of the solid line in FIG. 14C). For example, the bit density of the servo sector region SC9 may be decreased from BD1 to BD0.

The setting of this type of data format may be accomplished, for example, by making the set information SET shown in FIG. 6 the information of one revolution. That is, this may be accomplished by making the correspondence relationship between multiple logical blocks and servo sector regions SC1 to SC16 of one revolution, one set information SET. In this case, for example, since spindle motor 5 (refer to FIG. 1) rotates the magnetic disk 6 at a certain rotational speed, when HDC18 performs the read-write operation through the magnetic head 4, to match the setting of the data format, the frequency of the clock used for the read-write control is adjusted. For example, when the data format is set so that the bit density is equivalent through one revolution of the virtual circular orbit CO-2, HDC18 may adjust the frequency clock used for the read-write control approximately constant when the read-write operation is performed through the magnetic head 4.

In the second embodiment, at the magnetic disk device 100, the number of write bits of the servo sector region (the second servo sector region) SC1 where the servo interval is small in the virtual circular orbit CO is smaller than the number of write bits of the servo sector region (the first servo sector region) SC9 where the servo interval is large. Therefore, in comparison to the case where the data format is set so that the number of write bits is equivalent at each servo sector region (the comparative example), since the error rate to record to the magnetic disk 6 at the magnetic disk device 100 may be lowered, the reliability of the magnetic disk device 100 may be improved. That is, at the magnetic disk device 100, the data format characteristics relating to reliability may be improved. Therefore, improvement of the reliability is possible while maintaining the merit of the virtual circle control, and in comparison to the comparative example, providing the magnetic disk device with better reliability may become possible.

Also, the second embodiment gives precedence to the reliability of the magnetic disk 6 at the magnetic disk device 100, and the write bit density of the servo sector region (the first sector region) SC9 decreases, so that the bit density approaches the write bit density of the servo sector region (the second servo sector region) SC1. For example, through one revolution of the virtual circular orbit CO-2, HDC18 (the control section) decreases the bit density of the servo sector region where the servo interval is small so that the bit density approaches the servo sector region where the servo interval is large (for example, to become equivalent). Therefore, in comparison to the case where the data format is set so that the number of write bits of each servo sector region is equivalent, through one revolution of the virtual circular orbit CO-2, the error rate to record to the magnetic disk 6 at the magnetic disk device 100 may be lowered.

Also, in the second embodiment, since the bit density of each servo sector region at the magnetic disk device 100 may be made uniform along the virtual circular orbit CO-2, the error rate of each servo sector region may also be made uniform. Therefore, at the read control, the frequency of the occurrence of error correction processing may also be made uniform, and the read action may be stabilized.

Third Embodiment

Next, the magnetic disk device according to the third embodiment is described. In the following, only those parts different from the first and the second embodiments are described.

The first embodiment is an example where precedence is given to the recording capacity of the magnetic disk device 100; the second embodiment is an example where precedence is given to the reliability of the magnetic disk device 100. The third embodiment is an example where the recording capacity of the magnetic disk device 100 and the reliability of the magnetic disk device 100 are both considered.

Figure 15:
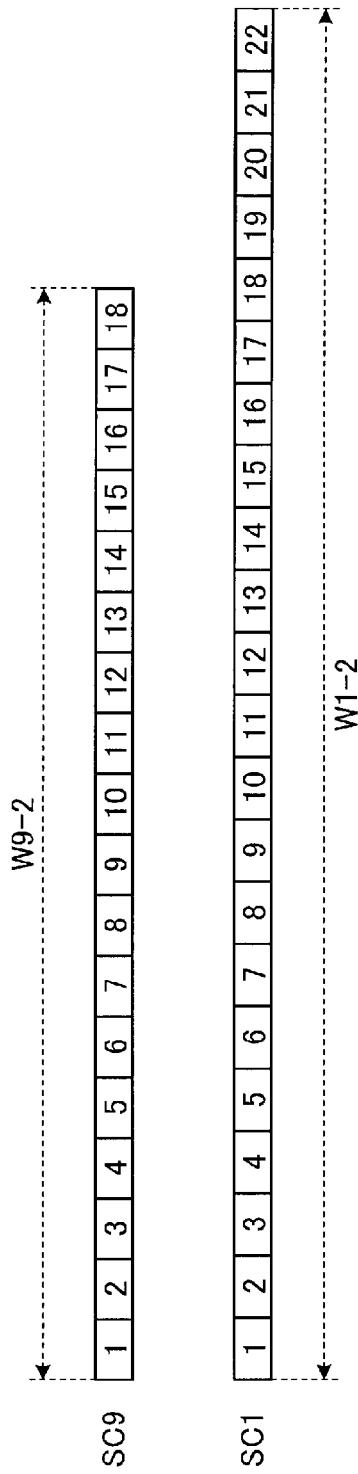
FIG. 15 shows the data format of the servo sector region according to a third embodiment.
Figure 16A:
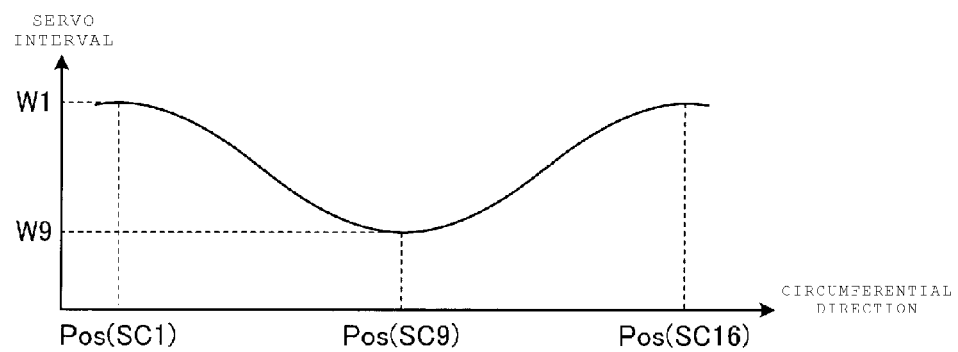
FIGS. 16A to 16C show the data format characteristics at each servo sector region of the virtual circular orbit in the third embodiment.
Figure 16B:
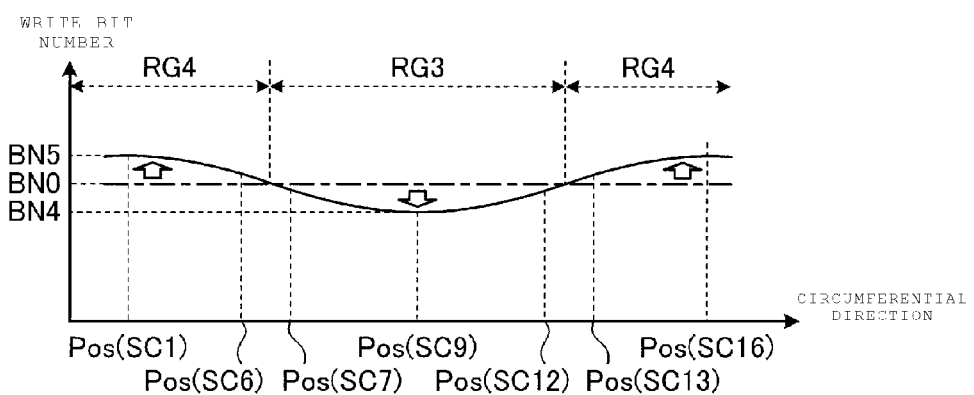
Figure 16C:
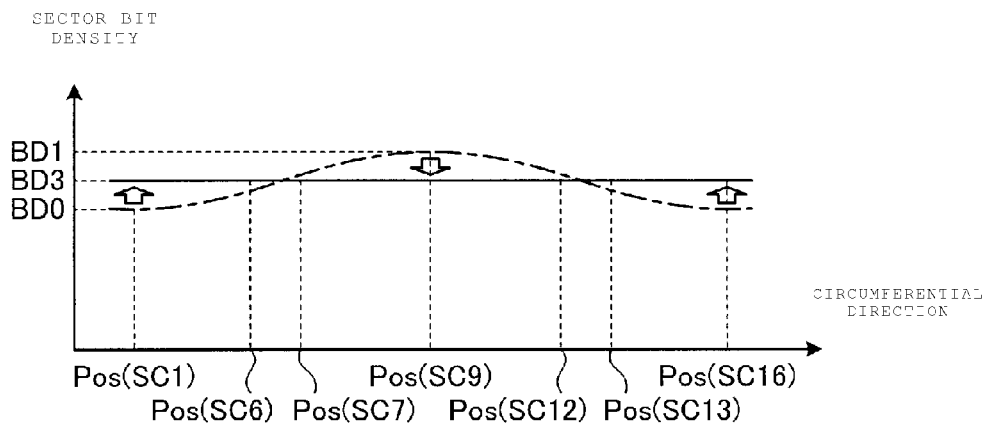

In the third embodiment, as shown in FIGS. 15 and 16A to 16C, by decreasing the number of write bits of the servo sector region where the servo interval is small and, at the same time, by increasing the number of write bits of the servo sector region where the servo interval is large, the improvement of the recording capacity of the magnetic disk device 100 and the reliability of the magnetic disk device 100 are achieved. FIG. 15 shows the data format of the servo sector region in the third embodiment. FIG. 16A shows the distribution of the servo interval along the virtual circular orbit. FIG. 16B shows the distribution of the number of write bits along the virtual circular orbit. FIG. 16C shows the distribution of the sector bit density along the virtual circular orbit. Note that, in FIGS. 16A to 16C, the circumferential direction position of the servo sector region is shown as Pos (number SC* of the servo sector region).

For example, as shown in FIG. 15, 22 write blocks are assigned to the servo sector region SC1. Twenty-two is greater than the number of write blocks (20) in the comparative example of the servo sector region SC1. At the same time, 18 write blocks are assigned to the servo sector region SC9. Eighteen is smaller than the number of write blocks (20) in the comparative example of the servo sector region SC9.

At this time, the servo interval W1-2 of the servo sector region SC1 is larger than servo interval W9-2 of the servo sector region SC9. Also, in each servo sector region, each write block has a fixed bit length. For this reason, in order for the bit density of the servo sector region SC1 and the bit density of the servo sector region SC9 to approach each other (for example, to become equivalent), the bit density of the servo sector region SC1 increases, and the bit density of the servo sector region SC9 decreases.

For example, along the virtual circular orbit CO-2 (refer to FIGS. 5A and 5B), from the servo sector region SC9 to the servo sector region SC1, the servo interval becomes gradually larger (refer to FIG. 16A). Correspondingly, from the servo sector region SC6 to the servo sector region SC1, the number of write bits increase, and at the same time, from the servo sector region SC7 to the servo sector region SC9, the number of write bits gradually decrease (refer to the feature of the solid line in FIG. 16B). For example, the number of write bits of the servo sector region SC1 increase from BN0 to BN5, and the number of write bits of the servo sector region SC9 decrease from BN0 to BN4. Also, from the servo sector region SC9 to the servo sector region SC16, the servo interval gradually becomes larger (refer to FIG. 16A). Correspondingly, from the servo sector region SC13 to the servo sector region SC16, the number of write bits gradually increases, and at the same time, from the servo sector region SC12 to the servo sector region SC9, the number of write bits gradually decrease (refer to the feature of the solid lines in FIG. 16B).

At this time, for example, the increase in the number of write bits of the servo sector region where the servo interval is large may be adjusted to become larger than the decrease in the number of write bits of the servo sector region where the servo interval is small. For example, the area of region between the solid line and the dashed line, at the third region RG3, where the solid line is below dashed line as shown in FIG. 16B, may be adjusted to become smaller than the area of region between the solid line and the dashed line, at the fourth region RG4, where the solid line is above the dashed line.

Therefore, through one revolution of the virtual circular orbit CO-2, in order for the bit density of the servo sector region where the servo interval is large and the bit density of the servo sector region where the servo interval is small to be able to approach to each other (for example, to become equivalent), the bit density of the servo sector region where the servo interval is large may be increased, and at the same time, the bit density of the servo sector region where the servo interval is small may be decreased (refer to the feature of the solid line in FIG. 16C). For example, the bit density of the servo sector region SC1 may be increased from BD0 to BD3, and the bit density of the servo sector region SC9 may be decreased from BD1 to BD0.

Setting this type of data format may be accomplished, for example, by making the set information SET shown in FIG. 6 the information of one revolution. That is, this may be accomplished by making the correspondence relationship between multiple logical blocks and servo sector regions SC1 to SC16 of one revolution, one set information SET. In this case, for example, since spindle motor 5 (refer to FIG. 1) rotates the magnetic disk 6 at a certain rotational speed, when HDC18 performs the read-write operation through the magnetic head 4, to match the setting of the data format, the frequency of the clock used for the read-write control is adjusted. For example, when the data format is set so that the bit density is equivalent through one revolution of the virtual circular orbit CO-2, HDC18 may adjust the frequency clock used for the read-write control to be approximately constant when the read-write operation is performed through the magnetic head 4.

In the third embodiment, in which HDC18 (the control section) considers both the recording capacity of the magnetic disk 6 and the reliability of the magnetic disk 6 at the magnetic disk device 100, in order for the write bit density of the servo sector region (the second servo sector region) SC1 and the write bit density of the servo sector region (the first sector region) SC9 to approach each other, the write bit density of the servo sector region (the second servo sector region) SC1 is increased, and at the same time, the write bit density of the servo sector region (the first sector region) SC9 is decreased. For example, the increase in the number of write bits of the servo sector region where the servo interval is large may be adjusted to become larger than the decrease in the number of write bits of the servo sector region where the servo interval is small. Therefore, compared to the case in which the data format is set so that the number of write bits of each servo sector region are equivalent, the surface density to record to the magnetic disk 6 at the magnetic disk device 100 may be improved, and at the same time, the error rate to record to the magnetic disk 6 at the magnetic disk device 100 may be lowered.

Also, in the third embodiment, in the magnetic disk device 100, HDC (the control section) 18, through one revolution of the virtual circular orbit CO-2, in order for the bit density of the servo sector region where the servo interval is large and the bit density of the servo sector region where the servo interval is small to approach each other, the bit density of the servo sector region where servo interval is large increases, and at the same time, the bit density of the servo sector region where the servo interval is small decreases. For example, the increase in the number of write bits of the servo sector region where the servo interval is large may be adjusted to become larger than the decrease in the number of write bits of the servo sector region where the servo interval is small. Therefore, compared to the case in which the data format is set so that the number of write bits of each servo sector region are equivalent, through one revolution of the virtual circular orbit CO-2, the surface density to record to the magnetic disk 6 at the magnetic disk device 100 may be improved, and at the same time, the error rate to record to the magnetic disk 6 at the magnetic disk device 100 may be lowered.

Also, in the third embodiment, at the magnetic disk device 100, through one revolution of the virtual circular orbit CO-2, since the bit density of each servo sector region may be made uniform, the error rate of each servo sector region may also be made uniform. Therefore, the frequency of the occurrence in error correction processing at the read control may also made uniform, and the read action may be stabilized.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk having servo patterns written thereon, including first, second, and third servo patterns, to define a plurality of servo sector regions between pairs of adjacent servo patterns;
a magnetic head configured to write data onto the magnetic disk; and
a control section configured to perform control of the magnetic head move along a virtual circular orbit of the magnetic disk that includes a first servo sector region that is between the first and second servo patterns and a second servo sector region that is between the second and third servo patterns, the second servo sector region storing a larger number of write bits than the first servo sector region, wherein an interval between heads of the first and second servo patterns is smaller than an interval between heads of the second and third servo patterns.

2. The magnetic disk device according to claim 1, wherein write bit densities of the first and the second servo sector regions are substantially the same.

3. The magnetic disk device according to claim 2, wherein write bit densities of the first and the second servo sector regions are near an error threshold level.

4. The magnetic disk device according to claim 2, wherein write bit densities of the first and the second servo sector regions are below an error threshold level.

5. The magnetic disk device according to claim 1, wherein write bit densities of the first and the second servo sector regions are not the same.

6. The magnetic disk device according to claim 1, wherein the virtual circular orbit includes other servo sector regions and the servo sector regions each store a different number of write bits.

7. The magnetic disk device according to claim 1, wherein the virtual circular orbit includes other servo sector regions and the servo sector regions include a first group of servo sector regions each storing a first number of write bits and a second group of servo sector region each storing a second number of write bits.

8. The magnetic disk device according to claim 1, further comprising a setting unit configured to set a data format for the servo sector regions.

9. The magnetic disk device according to claim 8, wherein data format sets a mapping of multiple logical blocks to the first servo sector region.

10. The magnetic disk device according to claim 8, wherein data format sets a mapping of multiple logical blocks to the first servo sector region and a mapping of a single logical block to the second servo sector region.

11. A method of setting a data format of a magnetic disk device having a magnetic disk having servo patterns written thereon, including first, second, and third servo patterns, to define a plurality of servo sector regions between pairs of adjacent servo patterns, a magnetic head configured to write data onto the magnetic disk, and a control section configured to perform control of the magnetic head to move along a virtual circular orbit of the magnetic disk that includes a first servo sector region that is between the first and second servo patterns and a second servo sector region that is between the second and third servo patterns, wherein an interval between heads of the first and second servo patterns is smaller than an interval between heads of the second and third servo patterns, the method comprising:

setting a data format of the first and second servo sector regions, such that the second servo sector region stores a larger number of write bits than the first servo sector region.

12. The method according to claim 11, wherein write bit densities of the first and the second servo sector regions are substantially the same.

13. The method according to claim 12, wherein said setting is performed to give precedence to a recording capacity to the magnetic disk, such that the write bit densities of the first and second servo sector regions are near an error threshold level.

14. The method according to claim 12, wherein said setting is performed to give precedence to a reliability of the magnetic disk, such that the write bit densities of the first and second servo sector regions are below an error threshold level.

15. The method according to claim 12, wherein said setting is performed to consider both a recording capacity and a reliability of the magnetic disk, such that the write bit densities of the first and second servo sector regions are between an error threshold level and a safe level.

16. A control method of the magnetic disk device including a magnetic disk having servo patterns written thereon, including first, second, and third servo patterns, to define a plurality of servo sector regions between pairs of adjacent servo patterns, a magnetic head configured to write data to the magnetic disk, and a control unit configured to perform control of the magnetic head to move along a virtual circular orbit of the magnetic disk that includes the plurality of servo sector regions, the method comprising:

measuring a servo interval for each of multiple servo sector regions along the virtual circular orbit;

in accordance with each of the servo intervals of the measured multiple servo sector regions, setting a data format for each of the servo sector regions, such that the servo sector regions with larger servo intervals store a larger number of write bits relative to the servo sector regions with smaller servo intervals.

17. The control method according to claim 16, wherein write bit densities of the servo sector regions are substantially the same.

18. The control method according to claim 17, wherein said setting is performed to give precedence to a recording capacity to the magnetic disk, such that the write bit densities of the servo sector regions are near an error threshold level.

19. The control method according to claim 17, wherein said setting is performed to give precedence to a reliability of the magnetic disk, such that the write bit densities of the servo sector regions are below an error threshold level.

20. The control method according to claim 17, wherein said setting is performed to consider both a recording capacity and a reliability of the magnetic disk, such that the write bit densities of the servo sector regions are between an error threshold level and a safe level.

* * * * *